（12) United States Patent
Brunn et al.

(10) Patent No.: US 10,249,068 B2
(45) Date of Patent: Apr. 2, 2019

(54) USER EXPERIENCE FOR MULTIPLE UPLOADS OF DOCUMENTS BASED ON SIMILAR SOURCE MATERIAL

(71) Applicant: International Business Machines Corporation, Armonk, NY (US)

(72) Inventors: Jonathan F. Brunn, Logan, UT (US); Jeffrey R. Hoy, Southern Pines, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 14/699,038

(22) Filed: Apr. 29, 2015

(65) Prior Publication Data

US 2016/0320945 A1    Nov. 3, 2016

(51) Int. Cl.
    *G06F 17/22* (2006.01)
    *G06F 17/24* (2006.01)
    *G06Q 10/10* (2012.01)
    *G06T 11/20* (2006.01)

(52) U.S. Cl.
    CPC ........ *G06T 11/206* (2013.01); *G06F 17/2211* (2013.01); *G06F 17/2288* (2013.01); *G06F 17/24* (2013.01); *G06Q 10/101* (2013.01)

(58) Field of Classification Search
    CPC .. G06F 17/2211; G06F 17/2288; G06F 17/24; G06Q 10/101; G06T 11/206
    See application file for complete search history.

(56) References Cited

U.S. PATENT DOCUMENTS

| 8,095,876 B1* | 1/2012 | Verstak | G06F 17/2211 715/273 |
| 8,238,696 B2* | 8/2012 | Dart | G06F 17/30244 382/228 |
| 8,745,075 B2 | 6/2014 | Gaucas et al. | |
| 2005/0262430 A1* | 11/2005 | Croft | G06Q 10/10 715/226 |
| 2007/0101256 A1* | 5/2007 | Simonyi | G06F 17/2288 715/203 |
| 2008/0177782 A1* | 7/2008 | Poston | G06F 17/2288 |
| 2011/0029482 A1 | 2/2011 | Gimson et al. | |
| 2014/0212053 A1 | 7/2014 | Horiuchi et al. | |

* cited by examiner

Primary Examiner — Manglesh M Patel
Assistant Examiner — Nicholas Hasty
(74) Attorney, Agent, or Firm — Scully, Scott, Murphy & Presser, P.C.; Robert C. Bunker

(57) ABSTRACT

Identifying changes to copied source to facilitate sharing of the changes, in one aspect, includes comparing elements of a document to other documents in a repository to classify an element of the document as being derived from a source document element of a source document in the repository. A user interface presents indications of all elements of the document classified as being a derived. The user interface also presents an indication of the source document from which the element of the document is derived. A connected graph representing a relationship between the document and the source document is generated and stored. Responsive to determining an update to the source document element, an action is performed to facilitate updating the element of the document based on the update to the source document element.

15 Claims, 8 Drawing Sheets

FIG. 2

Upload Files

⚠ At least one similar document already exists. Check the existing documents to upload as a new version instead of a new document.

Files: 📄 Social Objects.ppt

[Choose Files]

Tags: ⓘ

Share with: ⓘ
- ⦿ No one (Shared with me only)
- ○ People or Communities
- ○ Everyone in my organization External access: ⓘ ☐ Files can be shared with people external to my organization ☑ Allow others to share these files ⓘ

Near copies ⓘ  Check to upload as a new version
☐ Social Portal.odp in Sales Community

FIG. 3

USER EXPERIENCE FOR MULTIPLE UPLOADS OF DOCUMENTS BASED ON SIMILAR SOURCE MATERIAL

FIELD

The present application relates generally to computers and computer applications, and more particularly to document and web content management.

BACKGROUND

Sharing of documents and collaborative editing can create an unmanageable proliferation of similar documents. While advanced solutions exist for document versioning and collaborative editing, these solutions do not address cases in which a user copies content from an existing document and intentionally saves it into a new, separate document. For example, a technical user may use the outline of a technical design from another product, and add content relevant to the new product. This scenario does not create a new version of the document because the purpose is different. In another example, a presentation document may borrow slides from a set of available presentations with modifications. As another example, a text document may aggregate descriptions of products from multiple in-depth descriptions.

A problem arises, for example, in those scenarios when the source material changes. For instance, if the source text and slides are updated by the original owner, those updates may be valuable to capture in the derivative works. But since the derivative works are in new documents and new document types where traditional revision control would not apply, existing solutions cannot provide notification of update. It may also be the case that the owner of the new document may have forgotten where the source material came from. Even if the new document owner tracked the source material, the source material may have evolved into other versions, whether tracked by version control or outside the scope of version control.

BRIEF SUMMARY

A method and system of identifying changes to copied source to facilitate sharing of the changes may be provided. The method in one aspect may comprise comparing elements of a document to other documents in a repository to classify an element of the document as being derived from a source document element of a source document in the repository. The method may further comprise presenting on a user interface indications of all elements of the document classified as being a derived. The method may also comprise presenting on the user interface an indication of the source document from which the element of the document is derived. The method may further comprise generating a connected graph representing a relationship between the document and the source document. The method may also comprise storing the connected graph in a memory device. The method may further comprise, responsive to determining an update to the source document element, performing an action to facilitate updating the element of the document based on the update to the source document element.

A system of identifying changes to copied source to facilitate sharing of the changes, in one aspect, may comprise a memory, a processor coupled to the memory, and a user interface operable to execute on the processor. The processor may be operable to compare elements of a document to other documents in a repository to classify an element of the document as being derived from a source document element of a source document in the repository. The processor may be further operable to generate a connected graph representing a relationship between the document and the source document and store the connected graph in the memory device. The user interface may be operable to present indications of all elements of the document classified as being a derived. The user interface may be further operable to present an indication of the source document from which the element of the document is derived. Responsive to determining an update to the source document element, the processor may be further operable to perform an action to facilitate updating the element of the document based on the update to the source document element.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a screen shot of a user interface in one embodiment of the present disclosure.

FIG. 3 is another screen shot of the user interface in one embodiment of the present disclosure.

DETAILED DESCRIPTION

Figure 1:
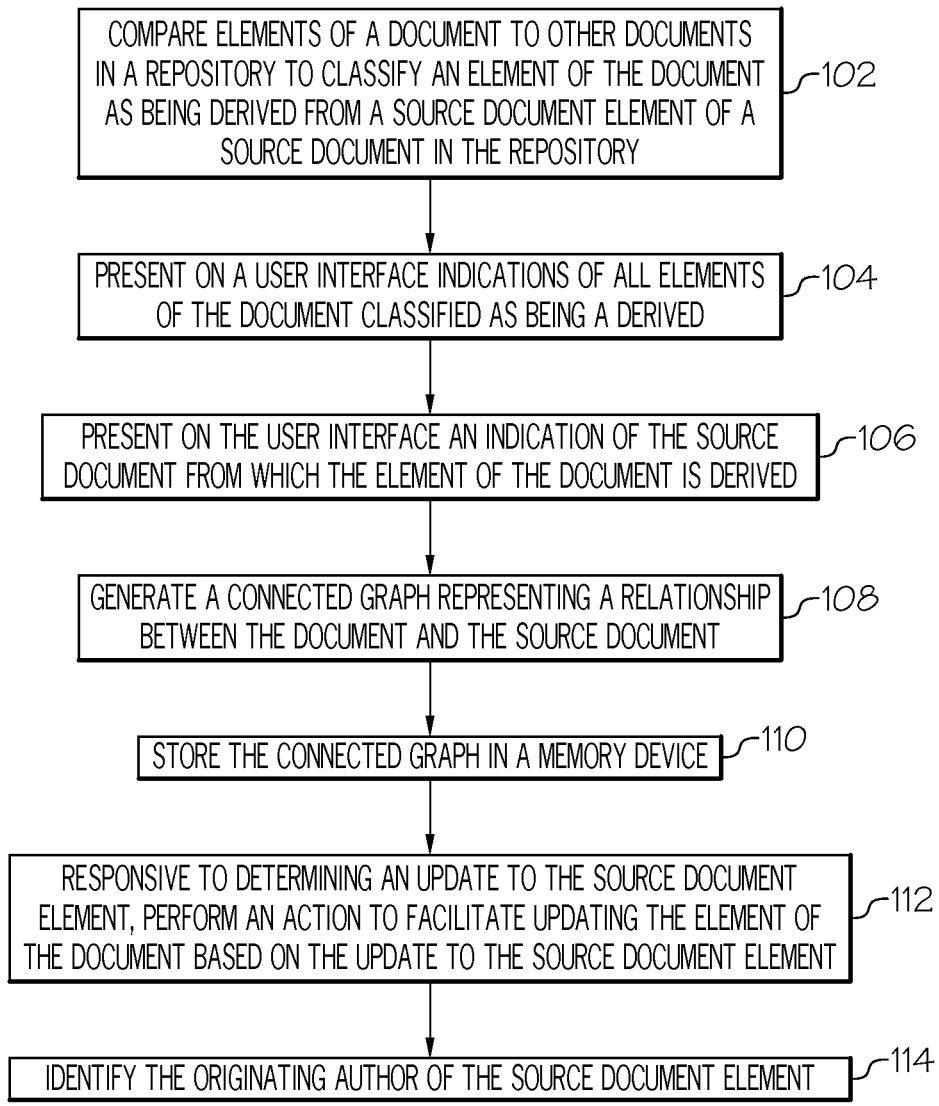
FIG. 1 is a flow diagram illustrating a method of identifying changes to copied source to facilitate sharing of the changes in one embodiment of the present disclosure.

The system and method of the present disclosure in one embodiment provide a solution that detects the proliferation of document content on a granular scale and surface those changes to the user in an easy-to-understand format.

A system and method are disclosed for identifying changes or updates in a source material and allowing a user to adopt those changes or updates to a newly uploaded document. Uploaded documents may be analyzed in relation to a corpus of documents in the system and a relationship (e.g., connection graph) between the documents may be established for sharing updates.

In one embodiment, the system and method of the present disclosure allow users to copy and paste content, and for content to organically be shared and modified through a variety of channels before generating or transforming it into a new document. In one aspect, the system and method of the present disclosure does not need to rely on any rules to associate material or create a template. In another aspect, the system and method of the present disclosure may identify similar documents and display them as a source and derived content.

Unlike existing techniques that focus on changing the document management system to prevent duplication from occurring, the method and system of the present disclosure in one embodiment acknowledge that the problem of creating duplicate documents is not completely preventable and provide a solution once duplication occurs. There may be reasons for having multiple copies of similar documents, for example, in order to maintain organizational boundaries or because documents are shared outside of a tool, edited and then re-uploaded later.

An embodiment of the system and method of the present disclosure identifies updates in source material that could be relevant to derivate works and presents to the end user a user interface allowing them to adopt changes from those documents or request access to derivative works they may not be familiar with and do not have access to.

An embodiment of the system and method of the present disclosure presents a list of source documents representing source material at a number of points in the document contribution and editing process. The points in the document contribution and editing process may include: When a new document is being uploaded, even prior to actually clicking upload and sending the new document to the server; When viewing document information; When inside a document in a document viewer or editor, the system and method of the present disclosure presents additional information from the document relationship database, e.g., including highlighting of areas in the document which may have been derived from other documents in the system, and identifying users and contributors to the other documents for potential connections and collaboration.

The system and method of the present disclosure may be useful, e.g., for maintaining multiple copies of a document. For instance, a document may be published externally as a copy to another community and there may continue to be a source copy where users work on the next revision for the broader community. The system and method of the present disclosure may improve revision management solutions, which require end users to specifically associate revisions, for instance, using compound documents or links between documents.

The system and method of the present disclosure in one embodiment may use existing techniques that detect revisions among a corpus of documents, e.g., hashing algorithms to find potential matches among a large number of documents and among portions of documents. Once a potential match is found, a document relationship is created in reference storage and both documents are added to the relationship.

The set of relationships forms a disconnected labeled graph. The labels maintain the location or a reference to a point within each document that caused the association to be made. The system and method of the present disclosure in one embodiment also maintains a model of the individual connected graphs with each being represented as a list of documents in a group or set. The group/set aspect may be provided as an optional index that the graph database can use for faster lookup. The group/set is the set of links from any node.

Figure 6:
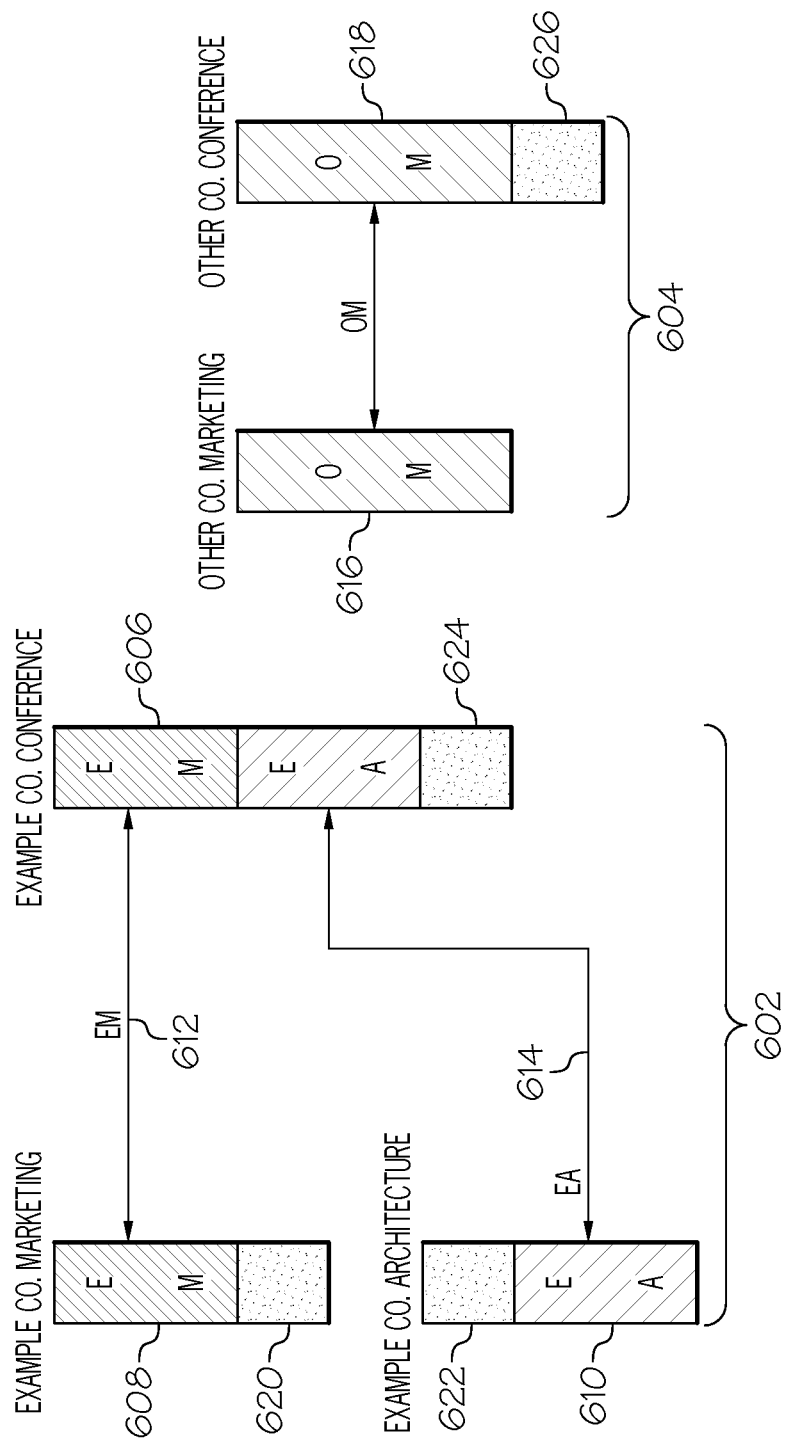
FIG. 6 shows sets of relationships forming disconnected labeled graphs in one embodiment of the present disclosure.

FIG. 6 shows sets of relationships forming disconnected labeled graphs in one embodiment of the present disclosure. In FIG. 6, two disconnected graphs 602 and 604 are shown. Example Co. Conference slidedeck 606 is built from parts of the Example Co. Marketing 608 and architecture decks 610.

The graph relates the three documents 606, 608, 610. The edges 612, 614 in the graph describe the content shared. As an optimization the graph database can store related documents as a set or group for each node. In the case of Example Co. Conference 606 the set would be EM and EA. Other Co. Marketing 616 and Other Co. Conference 618 represent another disconnected graph 604 of documents related to each other, but unrelated to the Example Co. Documents. The areas shown at 620, 622, 624, 626 represent other content that has not been shared across documents.

Figure 7:
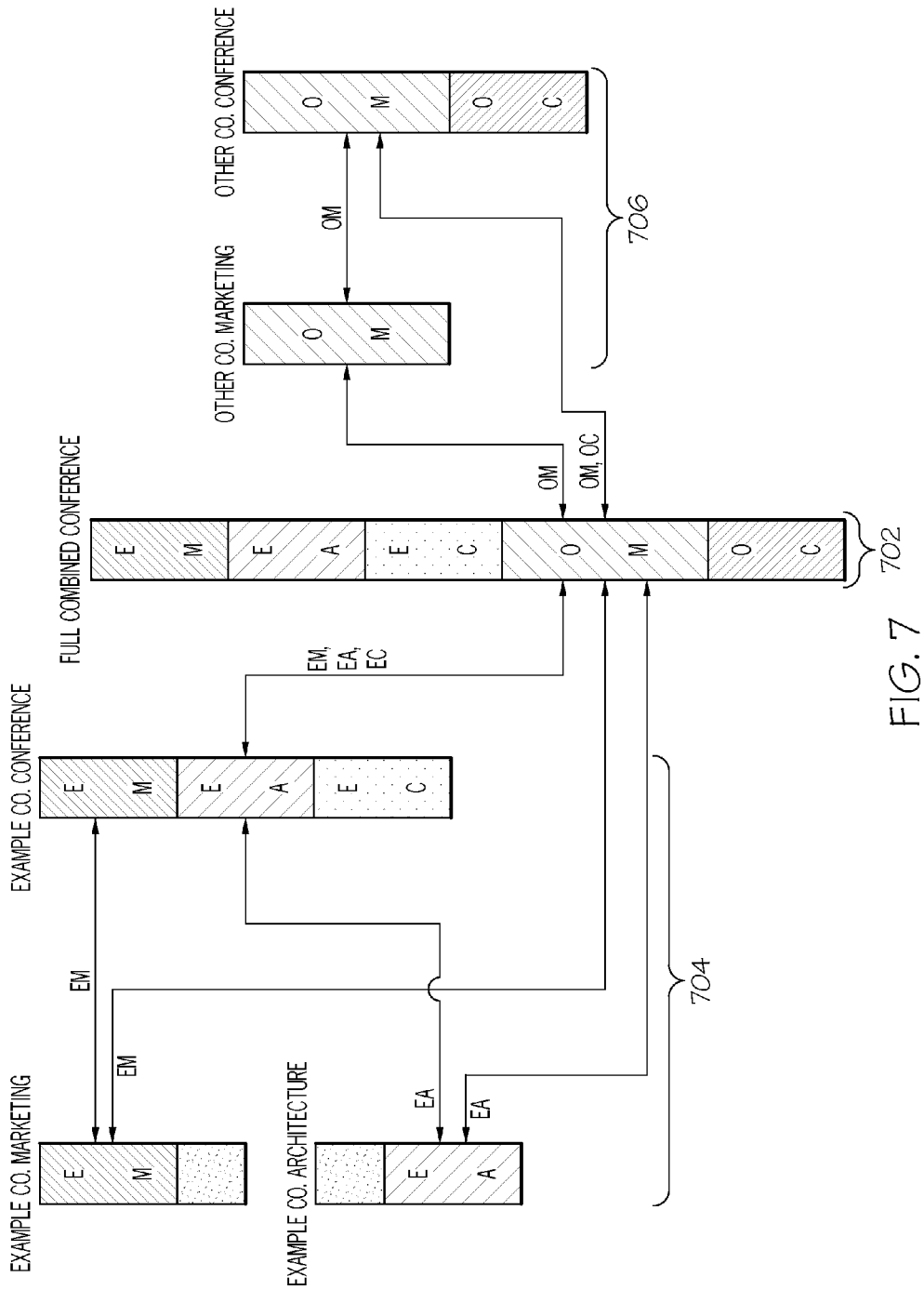
FIG. 7 shows an example of combined document sets represented in a graph in one embodiment of the present disclosure.

When a new document relationship is being added to the unconnected graph, the system checks to see if either document exists in a document set. If one exists in a document set, the other is added to that set. If both documents exist in separate sets, then the two sets are combined. In this way, the system maintains sets representing the members of each connected graph. FIG. 7 shows an example of combined document sets represented in a graph in one embodiment of the present disclosure. In this example, a user adds a Full Combined Conference slidedeck 702 that combines the two existing slidedecks 704, 706. The Full Combined Conference node 702 in the graph now connects to all related material. A user who views source material for Full Combined Conference slidedeck would see all nodes in the graph, for example.

Figure 8:
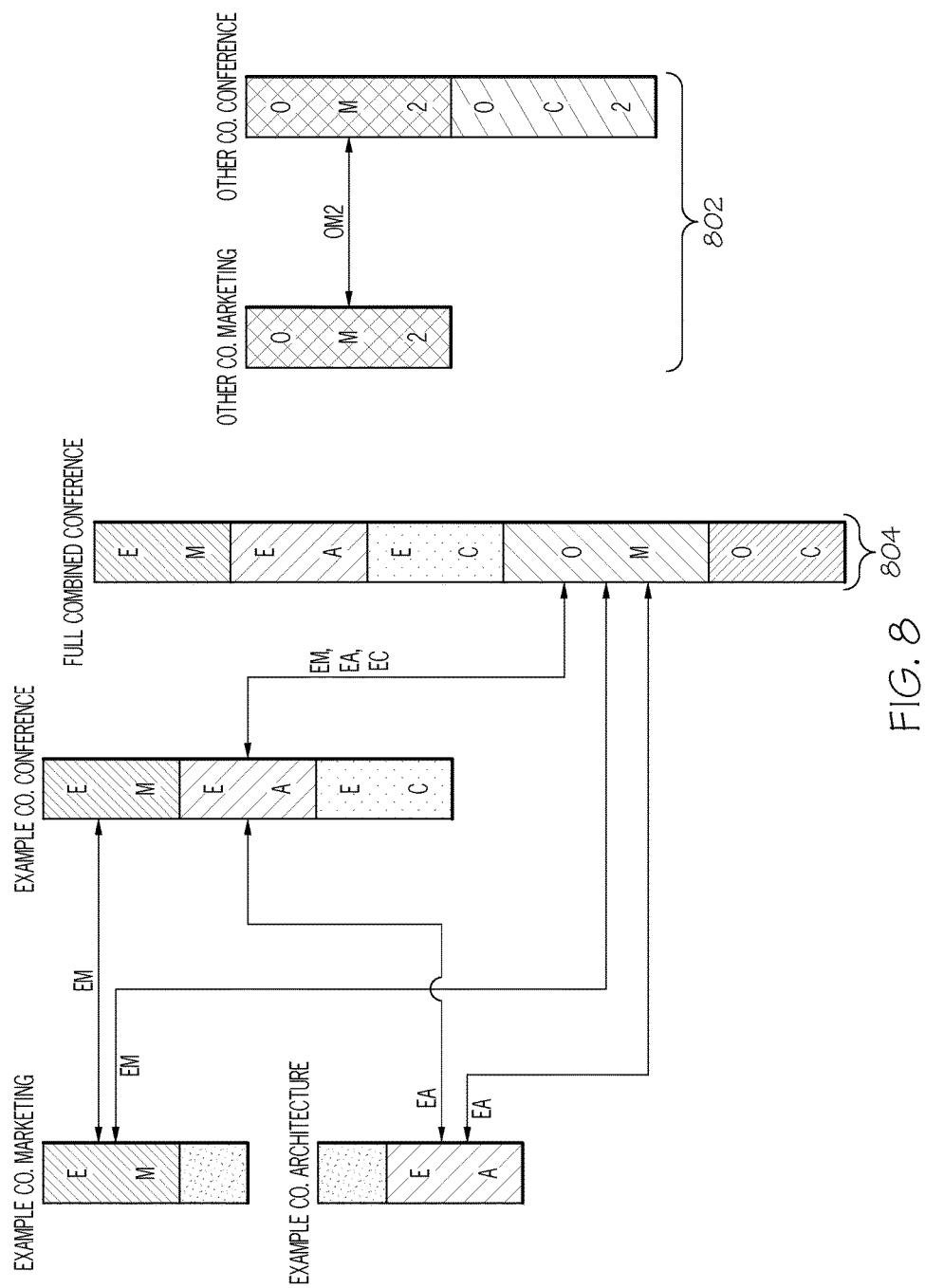
FIG. 8 shows an example of removing a match in one embodiment of the present disclosure.

By using this graph-based approach, an incorrect match may be removed from the system and the complete set of matches recalculated efficiently. The removal of a single incorrect "match" may result in two new distinction graphs by the removal of an edge. FIG. 8 shows an example of removing a match in one embodiment of the present disclosure. In this example, the Other Co. Marketing and Other Co. Conference slidedecks 802 are updated with entirely new content. The Full Combined Conference corresponding slides may be notified for update, but the owner chooses to not update. In this case, the edges between Full Combined Conference 804 and the Other Co. materials 802 are broken, as they no longer share material. The Other Co. materials 802 return to being a disconnected graph.

The user interface queries the graph database that stores the relationships to retrieve associated documents. When a document is being uploaded, the user interface may compute hashes of document content locally in the browser (for instance, by using Hypertext Markup Language (HTML) 5 file Application Programming Interfaces (APIs)) or in a client before the upload, and send this information to the server to find matching documents even before the document upload is complete. For instance, a user may use an enterprise collaboration tool that for example allows the user to upload and share documents. Responsive to the user starting an upload of a document, for example, via such a tool, a methodology in the present disclosure may perform a check to determine whether the content exists even before the upload completes. For instance, a desktop client may use local application APIs to parse the document, normalize styles and extract content for hashing, then send only this information to the server. The user may thus be informed of the existence of similar or identical documents prior to upload in order to consider this content. The existence of similar documents can be surfaced to the end user in multiple ways, for example, to show source material or to generate a list of contributors that could be added to the content.

The database performs an access control check on the resulting documents, and if the user does not have access to the documents in the result set, the system and method of the present disclosure in one embodiment returns a stub of the document with content removed but providing a URL to request access to the document.

FIG. 1 is a flow diagram illustrating a method of identifying changes to copied source to facilitate sharing of the changes in one embodiment of the present disclosure. At 102, elements of a document are compared to other documents in a repository to classify or identify that an element of the document is derived from a source document element of a source document in the repository. Examples of the elements include sections, pages, and portions of a document.

At 104, a user interface may present or display indications of all elements of the document classified or identified as derived.

At 106, an indication of the source documents from which the element of the document is derived may be also presented on the user interface. The user interface may allow a user to select the indication of a source document and display information about the source document.

At 108, relationships may be generated between the document and the identified source document, and the relationships may be stored in a repository. The relationships may be represented as connection graphs. At 110, the connection graphs may be stored in a memory device.

At 112, responsive to determining an update to the source document element, an action is performed to facilitate updating the element of the document based on the update to the source document element. An example of the action may be displaying an indication of the update to the source document element in a representation of the document.

At 114, an originating author of the source document element may be identified, for example, by following the edges in the graph back to the oldest (original) version of the sources. In one aspect, whenever a document is added to a system database of documents or the graph database, its author is recorded.

Figure 2:
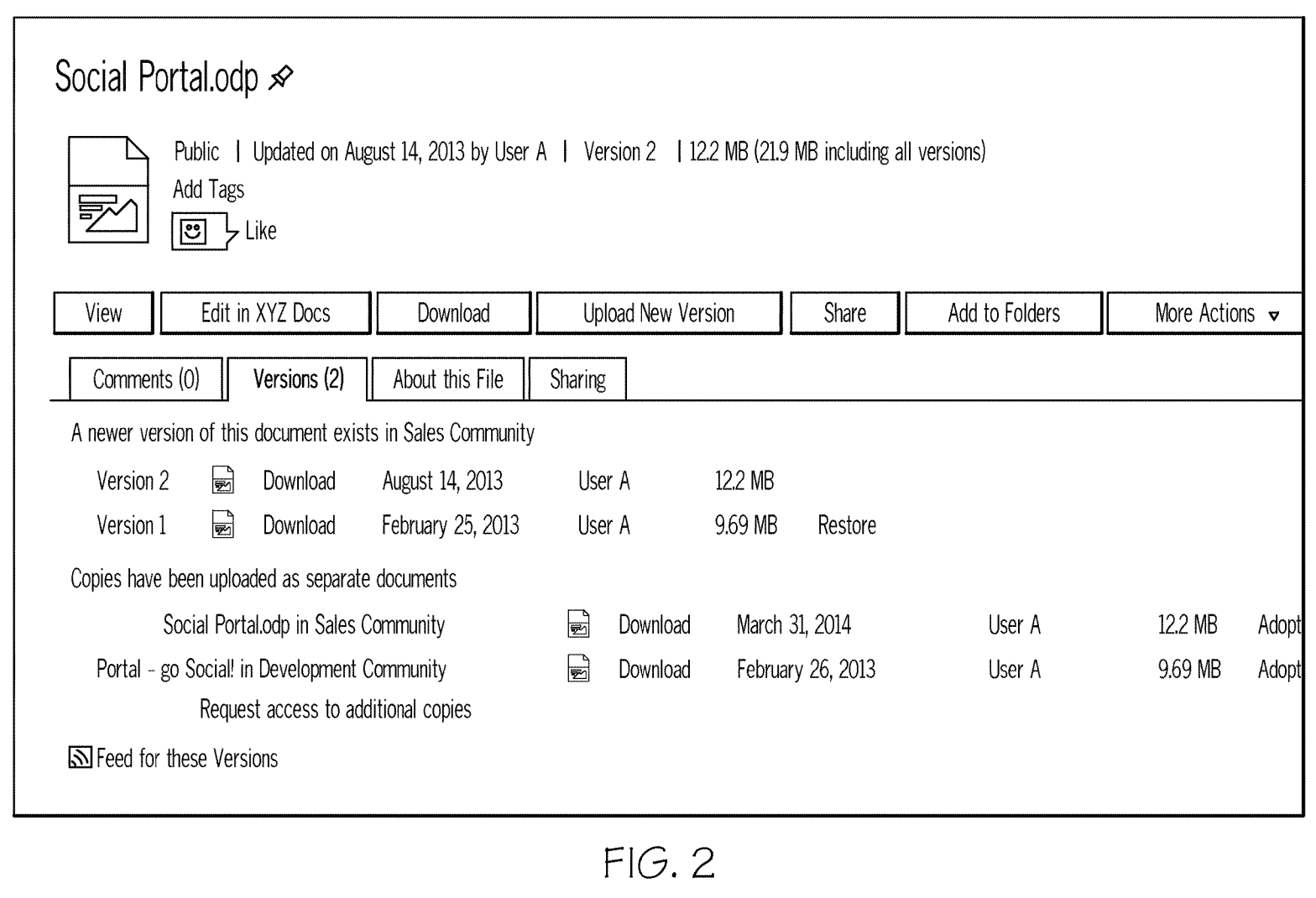

FIG. 2 is a screen shot of a user interface in one embodiment of the present disclosure. This screens shows a view of a single document in a system database. The document was uploaded by User A, and it has been updated once (two versions). The exact same document has also been found in two other places, in the two linked documents (both happen to also have been added by User A). The "request access to additional copies" button is available if there are other copies of the material, but the user does not have access to those copies due to the access control settings on those documents set by other users.

FIG. 3 is another screen shot of the user interface in one embodiment of the present disclosure. In this case the user is trying to upload a file, and the user browsed to a file on the user's machine. The system of the present disclosure in one embodiment computed the content overlap with other files in the system and found at least one match. A warning message is then displayed at the top as the user tried to upload the document, notifying the user not to upload the file because it is already in the system.

Figure 4:
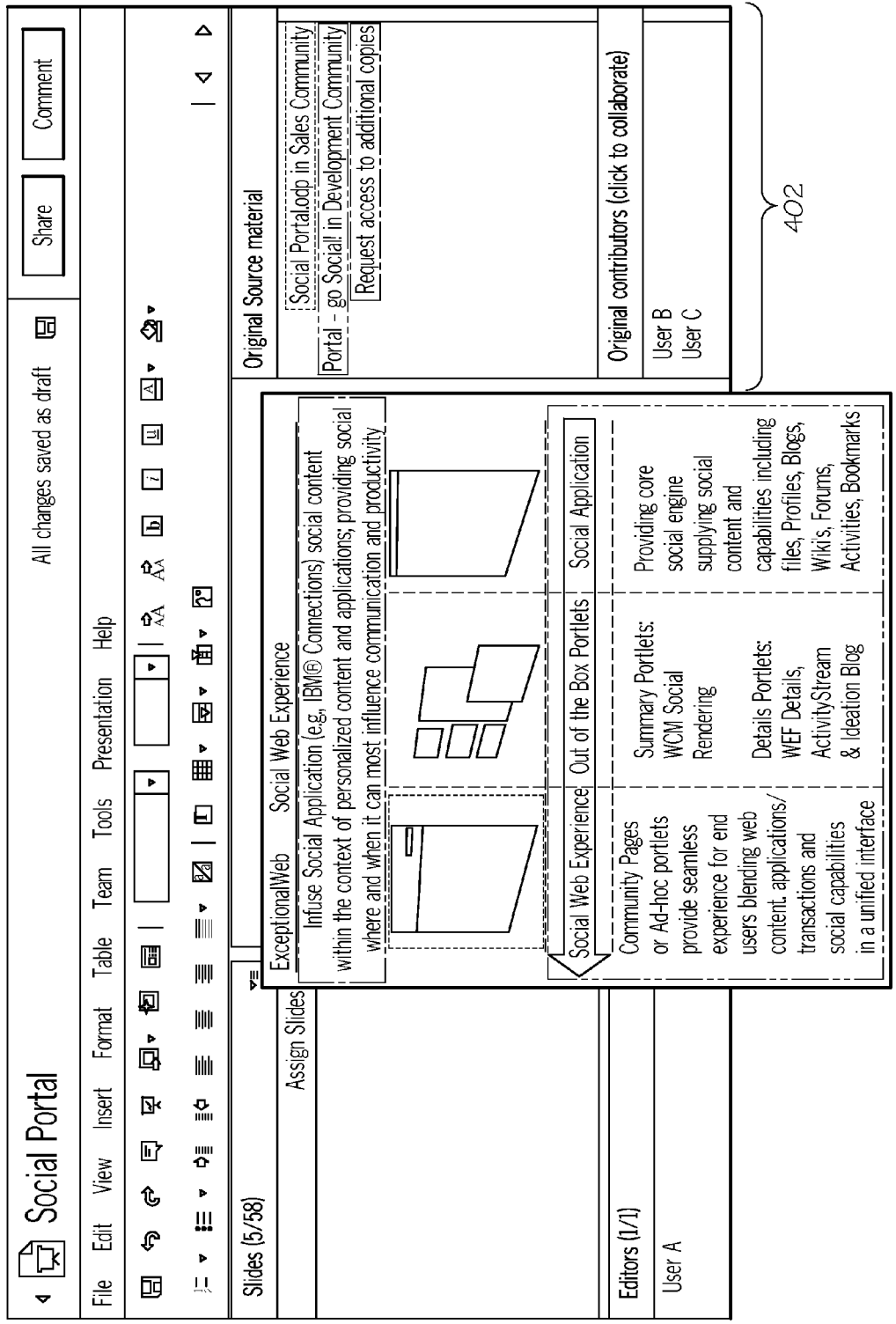
FIG. 4 is another screen shot of the user interface in one embodiment of the present disclosure.

FIG. 4 is another screen shot of the user interface in one embodiment of the present disclosure. In this example, the user is viewing a document in the user's enterprise collaboration tool. The system is also showing at 402 which files have similar content, and which people originally created the content in those similar files. This information may be determined by tracing back the graph edges to find the original version of the content. FIG. 4 shows an interface example of how the system and method of the present disclosure may augment existing document creation and collaboration tools.

Figure 5:
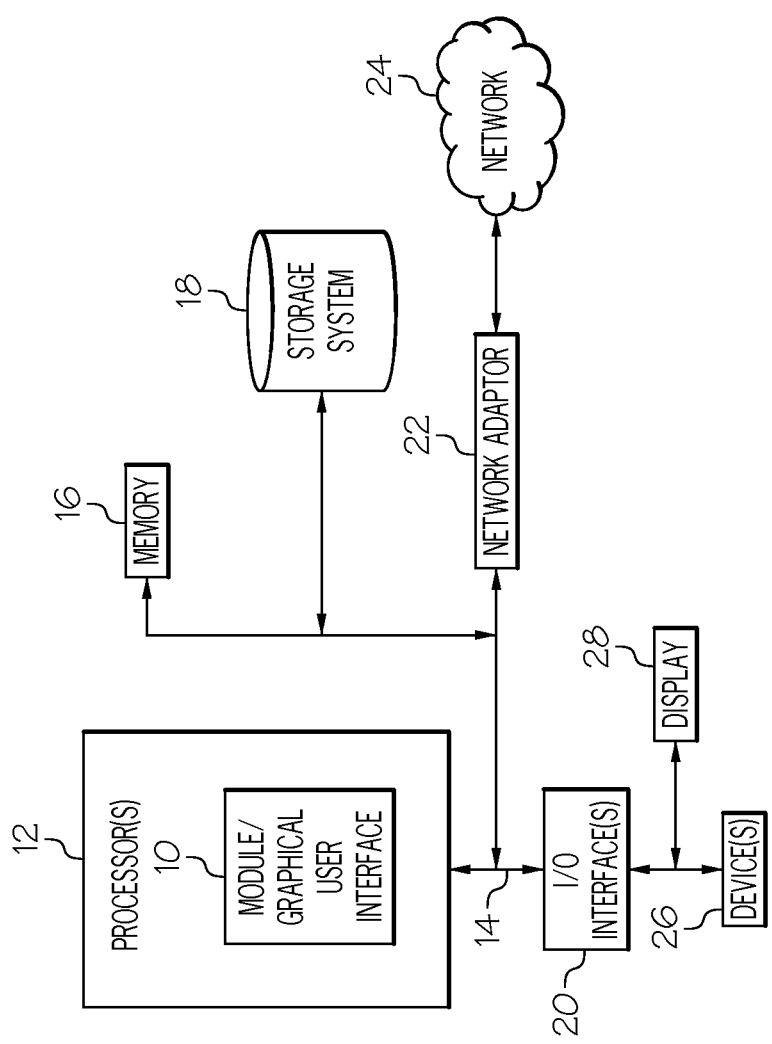
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of identifying changes to copied source to facilitate sharing of the changes, comprising:
    comparing elements of a document to other documents in a repository, the document and the other documents having no previous explicitly specified version control relationship, wherein a source-to-derived content relationship between the other documents and the document is discovered based on the comparing;
    classifying an element of the document as being derived from a source document element of a source document in the repository;
    presenting on a user interface indications of all elements of the document classified as being a derived;
    presenting on the user interface an indication of the source document from which the element of the document is derived;
    generating a connected graph representing a relationship between the document and the source document;
    storing the connected graph in a memory device;
    responsive to determining an update to the source document element, performing an action to facilitate updating the element of the document based on the update to the source document element; and
    responsive to determining based on the update to the source document element, that no source document elements in the source document correspond to any elements in the document, disconnecting the graph relationship between the document and the source document without removing the source document, wherein the source document remaining in the repository is represented in the graph stored in the memory device as disconnected from the document.

2. The method of claim 1, wherein the element includes a section of the document.

3. The method of claim 1, further comprising identifying an originating author of the source document element.

4. The method of claim 1, wherein the action comprises displaying an indication of the update to the source document element in a representation of the document.

5. The method of claim 1, wherein the user interface allows a user to select the indication of the source document, and responsive to the user selecting the indication of the source document, presenting information associated with the source document.

6. A computer readable storage medium storing a program of instructions executable by a machine to perform a method of identifying changes to copied source to facilitate sharing of the changes, the method comprising:
    comparing elements of a document to other documents in a repository, the document and the other documents having no previous explicitly specified version control relationship, wherein a source-to-derived content relationship between the other documents and the document is discovered based on the comparing;
    classifying an element of the document as being derived from a source document element of a source document in the repository;
    presenting on a user interface indications of all elements of the document classified as being a derived;
    presenting on the user interface an indication of the source document from which the element of the document is derived;
    generating a connected graph representing a relationship between the document and the source document;
    storing the connected graph in a memory device;
    responsive to determining an update to the source document element, performing an action to facilitate updating the element of the document based on the update to the source document element; and
    responsive to determining based on the update to the source document element, that no source document elements in the source document correspond to any elements in the document, disconnecting the graph relationship between the document and the source document without removing the source document.

7. The computer readable storage medium of claim 6, wherein the element includes a section of the document.

8. The computer readable storage medium of claim 6, further comprising identifying an originating author of the source document element.

9. The computer readable storage medium of claim 6, wherein the action comprises displaying an indication of the update to the source document element in a representation of the document.

10. The computer readable storage medium of claim 6, wherein the user interface allows a user to select the indication of the source document, and responsive to the user selecting the indication of the source document, presenting information associated with the source document.

11. A system of identifying changes to copied source to facilitate sharing of the changes, comprising:
   a memory;
   a processor coupled to the memory; and
   a user interface operable to execute on the processor,
   the processor operable to compare elements of a document to other documents in a repository, the document and the other documents having no previous explicitly specified version control relationship, wherein a source-to-derived content relationship between the other documents and the document is discovered based on the comparing, the processor further operable to classify an element of the document as being derived from a source document element of a source document in the repository, the processor further operable to generate a connected graph representing a relationship between the document and the source document and store the connected graph in the memory device,
   the user interface operable to present indications of all elements of the document classified as being a derived, the user interface further operable to present an indication of the source document from which the element of the document is derived,
   responsive to determining an update to the source document element, the processor operable to perform an action to facilitate updating the element of the document based on the update to the source document element, and
   responsive to determining based on the update to the source document element, that no source document elements in the source document correspond to any elements in the document, the processor operable to disconnect the graph relationship between the document and the source document without removing the source document.

12. The system of claim 11, wherein the element includes a section of the document.

13. The system of claim 11, wherein the processor is further operable to identify an originating author of the source document element.

14. The system of claim 11, wherein the action comprises displaying an indication of the update to the source document element in a representation of the document.

15. The system of claim 11, wherein the user interface allows a user to select the indication of the source document, and responsive to the user selecting the indication of the source document, presenting information associated with the source document.

* * * * *